US012120484B2

(12) United States Patent
Hu et al.

(10) Patent No.: US 12,120,484 B2
(45) Date of Patent: Oct. 15, 2024

(54) SPEAKER

(71) Applicant: AAC Microtech (Changzhou) Co., Ltd., Zhengzhou (CN)

(72) Inventors: Hongjian Hu, Shenzhen (CN); Shuai Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 268 days.

(21) Appl. No.: 17/744,755

(22) Filed: May 16, 2022

(65) Prior Publication Data

US 2023/0239613 A1 Jul. 27, 2023

(30) Foreign Application Priority Data

Jan. 26, 2022 (CN) ......................... 202220220129.3

(51) Int. Cl.
*H04R 1/28* (2006.01)
*H04R 1/02* (2006.01)

(52) U.S. Cl.
CPC ............ *H04R 1/288* (2013.01); *H04R 1/025* (2013.01); *H04R 2499/11* (2013.01)

(58) Field of Classification Search
CPC .... H04R 1/288; H04R 1/025; H04R 2499/11; H04R 7/04; H04R 2499/15; H04R 1/021; H04R 1/2811; H04R 2400/11
See application file for complete search history.

(56) References Cited

U.S. PATENT DOCUMENTS

| | | | | |
|---|---|---|---|---|
| 9,838,765 | B1 * | 12/2017 | Li | H04R 1/023 |
| 9,883,266 | B2 * | 1/2018 | Dai | H04R 9/06 |
| 10,334,354 | B2 * | 6/2019 | Qin | H04R 1/2803 |
| 10,349,167 | B2 * | 7/2019 | Wilk | H04R 1/288 |
| 10,419,847 | B2 * | 9/2019 | Choi | H04R 1/288 |
| 11,032,637 | B2 * | 6/2021 | Wang | H04R 31/006 |
| 2013/0094685 | A1 * | 4/2013 | Seo | H04R 1/021 381/332 |
| 2015/0358721 | A1 * | 12/2015 | Wang | H04R 1/2876 381/346 |
| 2018/0302731 | A1 * | 10/2018 | Liu | C01B 39/026 |
| 2022/0417649 | A1 * | 12/2022 | Zheng | H04R 1/2811 |

* cited by examiner

*Primary Examiner* — Daniel C Puentes
*Assistant Examiner* — Joseph James Peter Illicete
(74) *Attorney, Agent, or Firm* — W&G Law Group

(57) ABSTRACT

A speaker includes a housing having a receiving space, a speaker unit and a cavity received in the receiving space, sound-absorbing particles filled in the filling cavity, a filling hole opened in the housing and communicating with the filling cavity for filling the sound-absorbing particles into the filling cavity, a hole cover covering the filling hole and a resilient member filled in the filling hole. The resilient member can deform in the height direction of the filling hole, and the resilient member is sandwiched in a compressed state between the hole cover and the sound-absorbing particles. Compared with the related art, the sound-absorbing particles of the speaker disclosed by the present disclosure are not easily damaged.

7 Claims, 4 Drawing Sheets

A—A

SPEAKER

FIELD OF THE PRESENT DISCLOSURE

The present disclosure relates to electroacoustic transducers, in particular to a speaker.

DESCRIPTION OF RELATED ART

With the rapid development of mobile communication technology in recent years, consumers are increasingly using mobile communication devices with voice functions, such as portable phones, handheld game consoles, laptops, multimedia players and other devices that can communicate through public or private communication networks. Speaker, as a voice playback device, directly affects the performance of mobile communication devices.

In the related art, a speaker includes a speaker unit and a housing for receiving the speaker unit. The housing is provided with a filling cavity communicating with a rear cavity of the speaker unit for filling with sound-absorbing particles, so as to improve the low-frequency performance of the speaker.

However, in the related art, when the speaker filled with sound-absorbing particles is transported and bumped, the space among the sound-absorbing particles is compressed, so that the filling volume occupied by the sound-absorbing particles becomes smaller and a surplus space without the sound-absorbing particles is provided in the filling cavity. In a result, the sound-absorbing particles are easy to move and generate friction, which makes the sound-absorbing particles wear out and thus affects the effectiveness of the sound-absorbing particles.

Thus, it is necessary to provide a novel speaker to solve the problem.

SUMMARY

An objective of the present disclosure is to provide a speaker of which the sound-absorbing particles are not easily damaged.

In order to achieve the objective mentioned above, the present disclosure discloses a speaker comprising a housing having a receiving space, a speaker unit and a filling cavity received in the receiving space, sound-absorbing particles filled in the filling cavity, a filling hole opened in the housing and communicating with the filling cavity for filling the sound-absorbing particles into the filling cavity, a hole cover covering the filling hole, and a resilient member filled in the filling hole. The resilient member can deform in a height direction of the filling hole, and the resilient member is sandwiched in a compressed state between the hole cover and the sound-absorbing particles.

As an improvement, the resilient member is made of foam.

As an improvement, the resilient member is bonded to the hole cover.

As an improvement, the resilient member and the hole cover are integrally formed.

As an improvement, the housing comprises a top wall, a bottom wall opposite to the top wall and an outer side wall connecting the top wall and the bottom wall to enclose the receiving space, the speaker unit is spaced from the bottom wall to form the filling cavity.

As an improvement, the filling hole is located in the bottom wall.

As an improvement, a sound outlet is provided on the outer side wall, the housing further comprises a first retaining wall, a second retaining wall, a third retaining wall and a fourth retaining wall, the first retaining wall extends inclined from the bottom wall to the top wall and spaced from the top wall, the second retaining wall, the third retaining wall and the fourth retaining wall extends from the top wall to the bottom wall and spaced from the bottom wall, the first retaining wall is opposite to the sound outlet and inclined in a direction away from the sound outlet, the second retaining wall is located at a side of the first retaining wall away from the sound outlet and opposite to the first retaining wall, the third retaining wall is opposite to the fourth retaining wall, the third retaining wall and the fourth retaining wall connects the first retaining wall and the second retaining wall, an end of the first retaining wall away from the bottom wall and an end of the second retaining wall, an end of the third retaining wall and an end of the fourth retaining wall away from the top wall enclose a mounting platform, the speaker unit is mounted on a side of the mounting platform facing the bottom wall.

As an improvement, the speaker unit comprises a frame, a front cover covering the frame and a diaphragm sandwiched between the frame and the front cover, the front cover is provided with a sound outlet hole and connected to the mounting platform.

As an improvement, the bottom wall is provided with a leakage hole communicating with the filling cavity and the outside of the housing.

As an improvement, the bottom wall comprises a bottom wall body, a mounting hole opened in the bottom wall body and a bottom cover covering the mounting hole, the filling hole is opened in the bottom cover, the top wall comprises a top wall body, a through hole opened in the top wall body and a top cover covering the through hole, the top cover is arranged opposite to the front cover, the bottom wall body, the top wall body and the outer side wall are integrally formed.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure.

DETAILED DESCRIPTION OF THE EMBODIMENTS

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Figure 1:
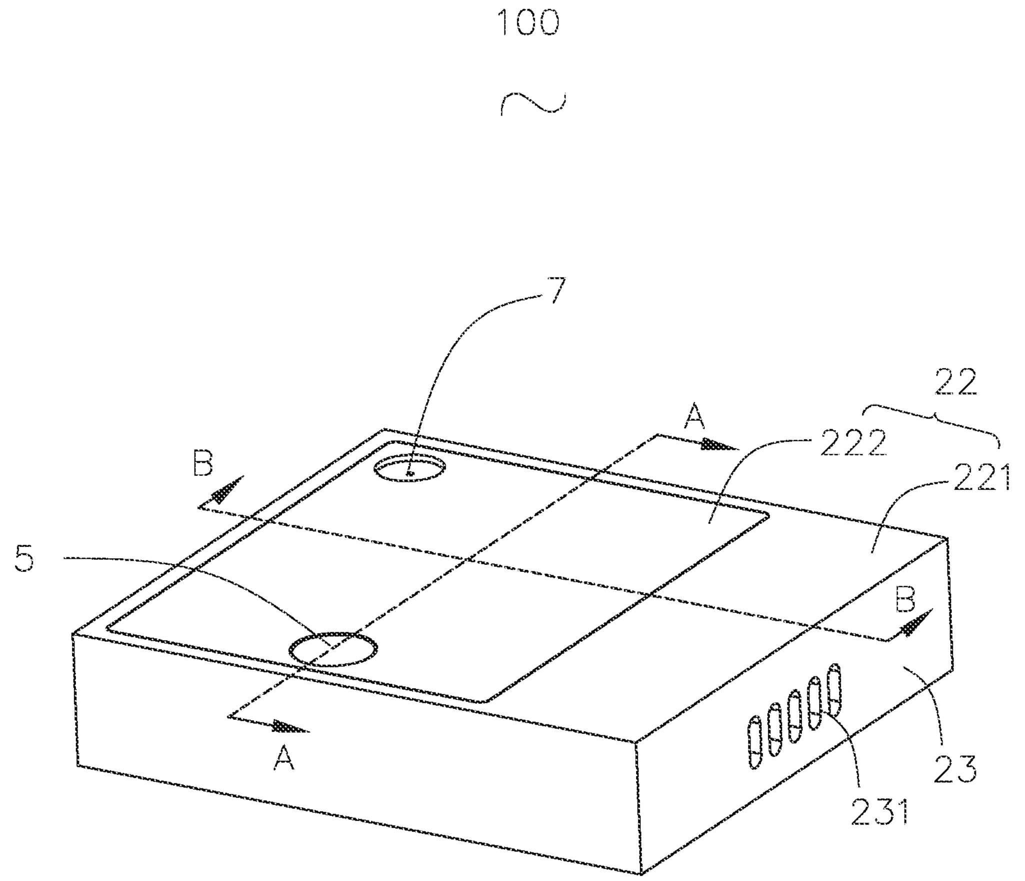
FIG. 1 is an isometric view of a speaker in accordance with an exemplary embodiment of the present disclosure.
Figure 2:
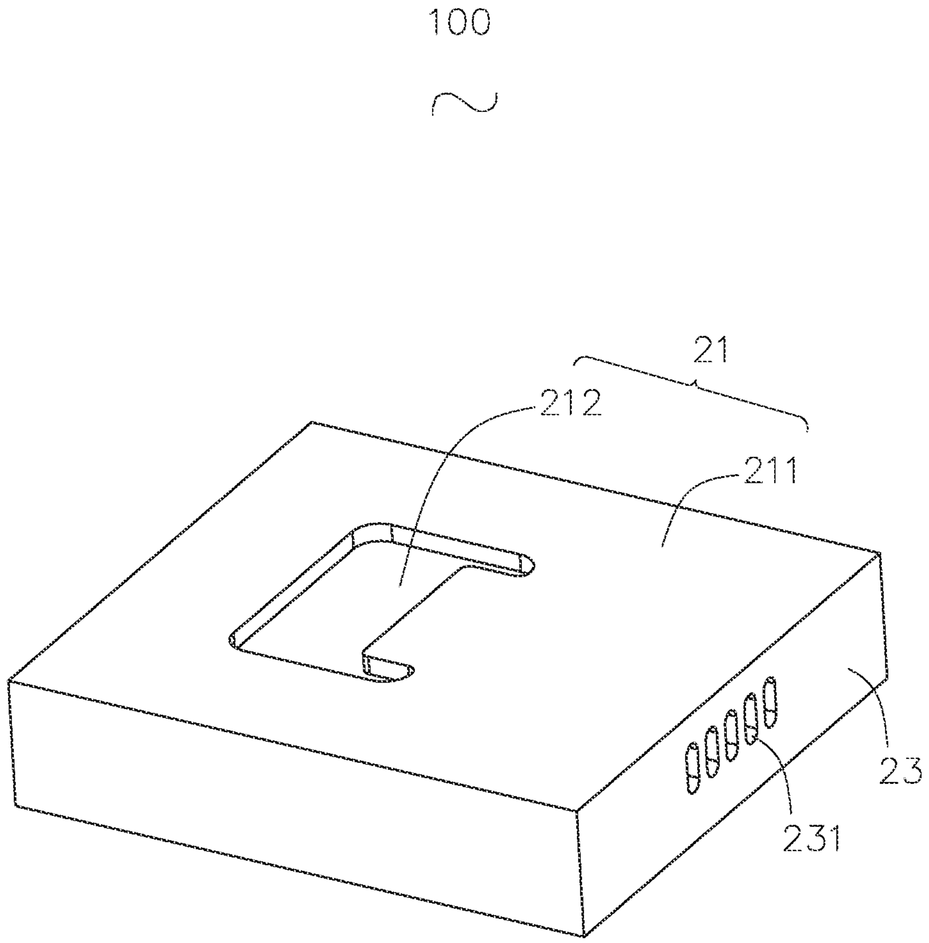
FIG. 2 is another isometric view of the speaker in FIG. 1.
Figure 3:
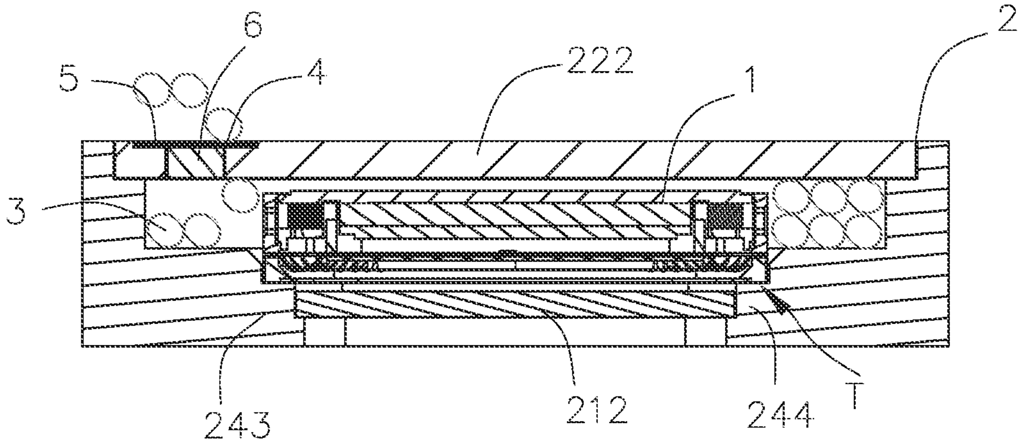
FIG. 3 is a cross-sectional view of the speaker taken along line A-A in FIG. 1.
Figure 4:
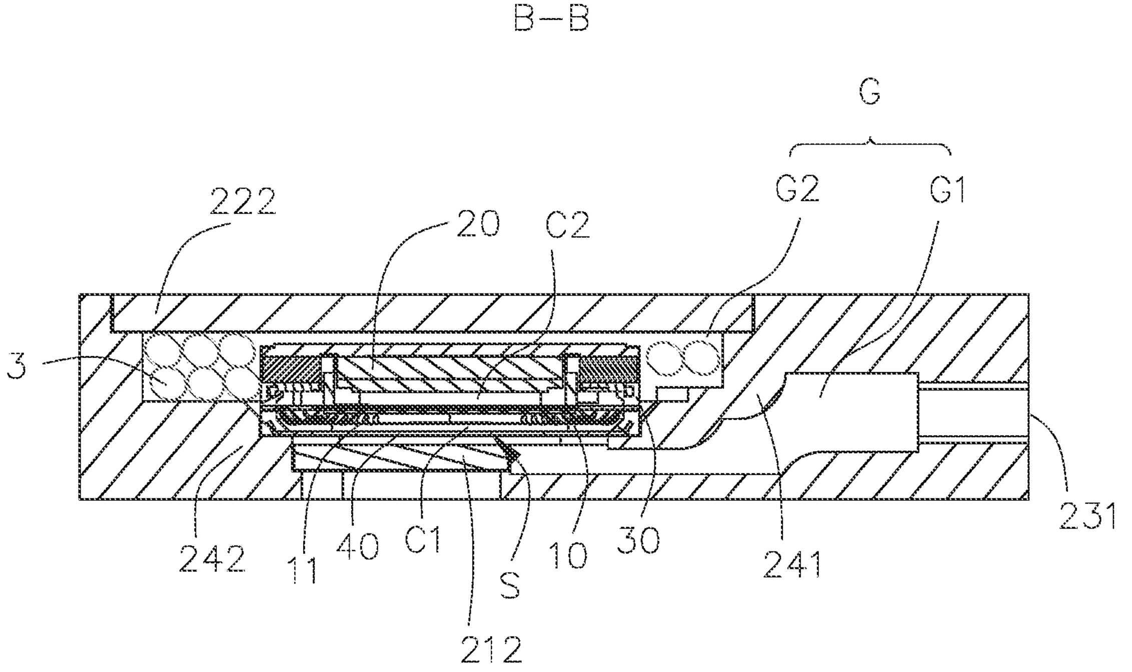
FIG. 4 is a cross-sectional view of the speaker taken along line B-B in FIG. 1.

Referring to FIGS. 1-4, the present disclosure discloses a speaker 100 comprising a speaker unit 1 and a housing 2 for receiving the speaker unit 1.

The speaker unit 1 comprises a vibration system 10, a magnetic circuit system 20, a frame 30 for receiving the vibration system 10 and the magnetic circuit system 20, and a front cover 40 covering the frame 30. The front cover 40 is provided with a sound outlet hole S. The vibration system 10 is sandwiched between the frame 30 and the front cover 40, and the magnetic circuit system 20 is assembled on a side of the vibration system 10 away from the front cover 40. Specifically, the vibration system 10 includes a diaphragm 11 for vibrating to produce sound. A front cavity C1 is formed between the diaphragm 11 and the front cover 40, and a rear cavity C2 is formed between the diaphragm 11, the magnetic circuit system 20 and the frame 30.

The housing 2 comprises a top wall 21, a bottom wall 22 opposite to the top wall 21 and an outer side wall 23 connecting the top wall 21 and the bottom wall 22 to enclose a receiving space G. A sound outlet 231 is provided on the outer side wall 23. The housing 2 further comprises a first retaining wall 241 extending inclined from the bottom wall 22 to the top wall 21 and spaced from the top wall 21. The first retaining wall 241 is opposite to the sound outlet 231 and inclined in a direction away from the sound outlet 231. The housing 2 further comprises a second retaining wall 242, a third retaining wall 243 and a fourth retaining wall 244 extending from the top wall 21 to the bottom wall 22 and spaced from the bottom wall 22. The second retaining wall 242 is located at the side of the first retaining wall 241 away from the sound outlet 231 and opposite to the first retaining wall 241. The third retaining wall 243 is opposite to the fourth retaining wall 244. The third retaining wall 243 and the fourth retaining wall 244 connect the first retaining wall 241 and the second retaining wall 242. An end of the first retaining wall 241 away from the bottom wall 22 and an end of the second retaining wall 242, an end of the third retaining wall 243 and an end of the fourth retaining wall 244 away from the top wall 21 enclose a mounting platform T to mount the speaker unit 1.

The speaker unit 1 is mounted on a side of the mounting platform T facing the bottom wall 22. Specifically, the front cover 40 of the speaker unit 1 is connected to the mounting platform T so that the sound outlet hole S is arranged opposite to the top wall 21. The first retaining wall 241, the second retaining wall 242, the third retaining wall 243, the fourth retaining wall 244, and the speaker unit 1 separate the receiving space G into a first receiving space G1 and a second receiving space G2, wherein the first receiving space G1 is formed as an outlet channel to communicating with the front cavity C1 and the sound outlet 231, so that the sound produced by the vibration of the diaphragm 11 is emitted from the sound outlet 231 through the outlet channel. The second receiving space G2 is formed as a filling cavity for filling the sound-absorbing particles 3. And a leakage portion (not shown) is provided on the frame 30 to connect the filling cavity and the rear cavity C2.

The speaker 100 also includes a filling hole 4 located in the bottom wall 22 and communicating with the filling cavity and a hole cover 5 covering the filling hole 4. The filling hole 4 is used to fill the filling cavity with the sound-absorbing particles 3.

The speaker 100 also includes a resilient member 6 provided in the filling hole 4. The resilient member 6 can deform in the height direction of the filling hole 4, i.e. the resilient member 6 can be elongated or compressed in the height direction of the filling hole 4.

When assembled, the resilient member 6 is sandwiched between the hole cover 5 and the sound-absorbing particles 3 in a compressed state. When the gap among the sound-absorbing particles 3 is compressed to a smaller size due to transportation bumps and so on, the resilient member 6 will be elongated in the height direction of the filling hole 4 and press against the sound-absorbing particles 3 to avoid loosening and friction between the sound-absorbing particles 3.

In the embodiment, the resilient member 6 is made of foam, but the material of the resilient member 6 is not limited, as long as the deformation capacity of the resilient member 6 can be achieved.

In the embodiment, the resilient member 6 is set separately from the hole cover 5, and is kept in the filling hole 4 only by the clamping force between the hole cover 5 and the sound-absorbing particles 3. In other embodiments, the resilient member 6 can be bonded with the hole cover 5, or can be integrally formed with the hole cover 5.

In the embodiment, the bottom wall 22 includes a bottom wall body 221, a mounting hole opened in the bottom wall body 221, and a bottom cover 222 covering the mounting hole. The filling hole 4 is opened in the bottom cover 222. The top wall 21 includes a top wall body 211, a through hole opened in the top wall body 211, and a top cover 212 covering the through hole. The top cover 212 is opposite to the front cover 40. The bottom wall body 221, the top wall body 211 and the outer side wall 23 are integrally formed. But the disclosure does not limit the specific structure and the forming method of the bottom wall 22, the top wall 21 and the outer side wall 23 of the housing 2.

In the embodiment, the bottom wall 22 is also provided with a leakage hole 7 communicating with the filling cavity and the outside of the housing 2 to balance the sound pressure in the filling cavity. But the leakage hole 7 is optional.

In the disclosure, because of the deformation ability, the resilient member can deform and press the sound-absorbing particles when the filling volume of the sound-absorbing particles becomes smaller, so as to avoid the movement and wear of the sound-absorbing particles.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A speaker, comprising:
- a housing having a receiving space;
- a speaker unit and a filling cavity received in the receiving space;
- sound-absorbing particles filled in the filling cavity;
- a filling hole opened in the housing and communicating with the filling cavity for filling the sound-absorbing particles into the filling cavity;
- a hole cover covering the filling hole; and
- a resilient member filled in the filling hole;
- wherein,
- the resilient member can deform in a height direction of the filling hole, and the resilient member is sandwiched in a compressed state between the hole cover and the sound-absorbing particles;
- wherein the housing comprises a top wall, a bottom wall opposite to the top wall and an outer side wall connecting the top wall and the bottom wall to enclose the receiving space, the speaker unit is spaced from the bottom wall to form the filling cavity;

wherein the speaker unit comprises a frame, a front cover covering the frame and a diaphragm sandwiched between the frame and the front cover, the front cover is provided with a sound outlet hole and connected to a mounting platform;

wherein the bottom wall comprises a bottom wall body, a mounting hole opened in the bottom wall body and a bottom cover covering the mounting hole, the filling hole is opened in the bottom cover, the top wall comprises a top wall body, a through hole opened in the top wall body and a top cover covering the through hole, the top cover is arranged opposite to the front cover, the bottom wall body, the top wall body and the outer side wall are integrally formed.

2. The speaker as described in claim 1, wherein the resilient member is made of foam.

3. The speaker as described in claim 1, wherein the resilient member is bonded to the hole cover.

4. The speaker as described in claim 1, wherein the resilient member and the hole cover are integrally formed.

5. The speaker as described in claim 1, wherein the filling hole is located in the bottom wall.

6. The speaker as described in claim 1, wherein a sound outlet is provided on the outer side wall, the housing further comprises a first retaining wall, a second retaining wall, a third retaining wall and a fourth retaining wall;

the first retaining wall extends inclined from the bottom wall to the top wall, and is spaced from the top wall;

the second retaining wall, the third retaining wall and the fourth retaining wall extend from the top wall to the bottom wall and are spaced from the bottom wall;

the first retaining wall is spaced from the sound outlet and inclined in a direction away from the sound outlet, the second retaining wall is located at a side of the first retaining wall away from the sound outlet and opposite to the first retaining wall, the third retaining wall is opposite to the fourth retaining wall, the third retaining wall and the fourth retaining wall connects the first retaining wall and the second retaining wall;

an end of the first retaining wall away from the bottom wall, an end of the second retaining wall, an end of the third retaining wall, and an end of the fourth retaining wall away from the top wall enclose the mounting platform; the speaker unit is mounted on a side of the mounting platform facing the bottom wall.

7. The speaker as described in claim 1, wherein the bottom wall is provided with a leakage hole communicating with the filling cavity and an outside of the housing.

* * * * *